United States Patent
Miyabukuro

(10) Patent No.: US 6,648,480 B2
(45) Date of Patent: Nov. 18, 2003

(54) EXTERNAL REAR-VIEW MIRROR

(75) Inventor: Pedro Takashi Miyabukuro, Santo André-Estado de São Paulo (BR)

(73) Assignee: Metagal Industria E Comercio Ltda., Sao Paulo (BR)

(*) Notice: Subject to any disclaimer, the term of this patent is extended or adjusted under 35 U.S.C. 154(b) by 0 days.

(21) Appl. No.: 10/320,298

(22) Filed: Dec. 16, 2002

(65) Prior Publication Data

US 2003/0086190 A1 May 8, 2003

Related U.S. Application Data

(62) Division of application No. 09/886,866, filed on Jun. 21, 2001, now Pat. No. 6,547,407.

(51) Int. Cl.$^7$ ................................................ G02B 7/18
(52) U.S. Cl. ...................... 359/841; 359/879; 359/877; 359/838
(58) Field of Search ................................. 359/841, 879, 359/871, 872, 873, 874, 877, 838

(56) References Cited

U.S. PATENT DOCUMENTS

| | | | | | |
|---|---|---|---|---|---|
| 4,701,037 | A | * | 10/1987 | Bramer | 359/874 |
| 5,610,772 | A | * | 3/1997 | Iizuka | 359/841 |
| 6,217,181 | B1 | * | 4/2001 | Lynam et al. | 359/879 |
| 6,310,738 | B1 | * | 10/2001 | Chu | 359/883 |

* cited by examiner

Primary Examiner—Mohammad Sikder
(74) Attorney, Agent, or Firm—Michael J. Striker

(57) ABSTRACT

An external rearview mirror of an automotive vehicle has a mirror plate set including a mirror plate and a rear cover, a moving mechanism for the mirror plate set and including a bearing/electric motor set, a housing in which the mirror plate set and the bearing/motor set are accommodated, a base with which the housing is connected in an articulated manner, the base being fixable to a side of a vehicle, the mirror plate set and the bearing/motor set being directly fixed with one another with the use of parts including one part provided in the mirror plate set and another part provided in the bearing/engine set and connectable with the one part.

1 Claim, 1 Drawing Sheet

EXTERNAL REAR-VIEW MIRROR

CROSS-REFERENCE TO A RELATED APPLICATION

This application is a division of patent application Ser. No. 09/886,866 filed on Jun. 21, 2001, now U.S. Pat. No. 6,547,402 now allowed.

BACKGROUND OF THE INVENTION

The present invention relates to external rearview mirrors.

An external rearview mirror usually includes a mirror plate set composed of a mirror plate and a cover in which the mirror plate is fixed, a motion mechanism with a part connected with the mirror plate set and including a bearing in a manual mirror or an electric motor in an electric mirror, a housing in which the plate and the bearing/motor set is assembled, and a base which articulately supports the housing and is fixed to the vehicle.

In known rearview mirrors, the mirror plate set is connected with the bearing/motor set through an adaptor. The adaptor is formed as a plate which is located between the cover of the mirror plate set and the bearing/motor of the bearing/motor set and has parts of a mechanical connection device connected correspondingly to the cover and to the bearing/motor. It is desirable to simplify the construction and to decrease the cost of such external rearview mirrors.

SUMMARY OF THE INVENTION

Accordingly, it is an object of present invention to provide an external rearview mirror which is a further improvement of the existing external rearview mirrors.

More particularly it is an object of the present invention to provide an external rearview mirror which is simpler than existing devices and provides a direct connection of the mirror set to the bearing/motor without the use of an adaptor.

In keeping with these objects and with others which will become apparent hereinafter, one feature of present invention resides, briefly stated, in an external rearview mirror which has a mirror plate set including a mirror plate and a rear cover; a moving mechanism for said mirror plate set and including a bearing/electric motor set; a housing in which said mirror plate set and said bearing/motor set are accommodated; a base with which said housing is connected in an articulated manner, said base being fixable to a side of a vehicle, said mirror plate set and said bearing/motor set being directly fixed with one another with use of parts including one part provided in said mirror plate set and another part provided in said bearing/engine set and connectable with said one part.

When the external rearview mirror is designed in accordance with the present invention, it is a further improvement of the existing external rearview mirrors, it has a simpler construction, reduced number of parts, and lower costs.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing an external rearview mirror in accordance with the present invention.

DESCRIPTION OF THE PREFERRED EMBODIMENTS

Figure 1:
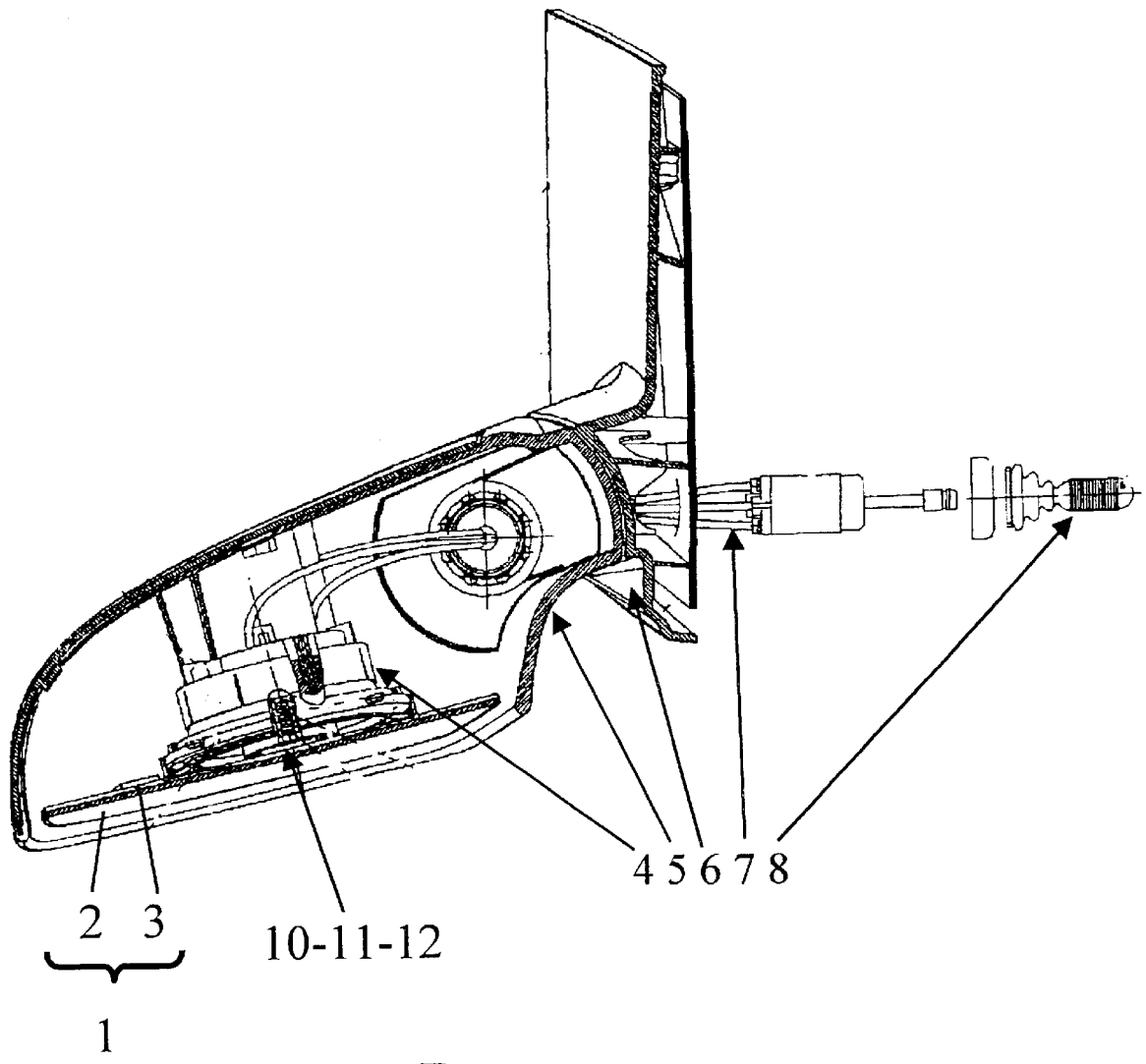

An external rearview mirror in accordance with the present invention has a mirror plate set which is identified as a whole with reference numeral 1. A mirror plate set has a mirror plate 2 and a cover 3 in which the plate is fixed.

The external rearview mirror further has a motion mechanism for the mirror plate set 1. The motion mechanism 4 includes a bearing set when the external rearview mirror is formed as a manual mirror, or an electric motor set when the external rearview mirror is formed as electric external rearview mirror. The mirror plate set 1 is connected with the motion mechanism 4.

The external rearview mirror further has a housing which is identified with reference numeral 5. The mirror plate set 1 and the bearing/motor set 4 are assembled and accommodated in the housing 5. Finally, the external rearview mirror has a base 6 in which the housing 5 is fixed in an articulated way. The base 6 is fixed to a side of the vehicle.

In accordance with the present invention, the mirror plate set 1 and the bearing/motor set 4 are fixed directly to one another. For this purpose connecting parts 10 and 11 are provided in the mirror plate set 1 and in the bearing/motor set 4 correspondingly. A third element 12 can be provided for making a connection between the parts 10 and 11.

In accordance with the present invention, the parts 10, 11 and 12 can be formed in the following manner. The part 10 can be formed as holes 10 provided directly in the cover 3 of the mirror plate set 1. The parts 11 can be formed by corresponding holes 11 provided directly in the bearing/motor set 4. Finally, the part 12 can be formed as screws which are inserted in the holes 10 and 11 when they are aligned with one another and to provide a direct mechanical connection between the parts 10 and 11, and therefore between the sets 1 and 4.

The external rearview mirror can of course have other components such as a motor electrical supply circuit with an actuation button inside the vehicle compartment or movement transmission cables between the bearing and the internal lever of the vehicle, as well as a mirror safety mechanism against impacts, and also other known components.

In accordance with a non-illustrated embodiment of the present invention, the mirror plate set 1 and the bearing/motor set 4 can be connected with one another by insertion into each other. In this case, insertion parts are provided on the cover 3 of the mirror plate set 1, and corresponding insertion parts are provided on the bearing/motor set 4. The insertion parts can be coupled with one another, providing the direct assembling between the cover and the bearing/motor.

In another not shown embodiment, the connection between the mirror cover 3 and the bearing/motor set 4 can be provided with surfaces in the cover and in the bearing/motor set correspondingly which are connected with one another with a corresponding glue or by welding.

It is to be understood that the connection of the mirror plate set with the bearing/motor set by screws, by insertion, or by glue or welding, the dimension, quantity and other features of the hose and screws, insertion parts, or the surfaces to be glued or welded are selected in correspondence with the mirror cover 3 and the bearing/motor set 4 to be joined with one another.

It will be understood that each of the elements described above, or two or more together, may also find a useful application in other types of constructions differing from the types described above.

While the invention has been illustrated and described as embodied in external rear-view mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claim is:

1. An external rearview mirror of an automotive vehicle, comprising a mirror plate set including a mirror plate and a rear cover; a moving mechanism for said mirror plate set and including a moving mechanism set selected from the group consisting of a bearing set and a motor set; a housing in which said mirror plate set and said moving mechanism set are accommodated; a base with which said housing is connected in an articulated manner, said base being fixable to a side a vehicle, said mirror plate set and said moving mechanism set being directly fixed with one another with use of parts including one part provided on said mirror plate and another part provided in said moving mechanism set, said cover of said mirror plate set having a first surface forming said one part, said transmission mechanism set having a second surface which is formed as said another part, said surfaces being connected with one another by a welding seam.

* * * * *